United States Patent
O'Connor et al.

(10) Patent No.: US 10,953,768 B2
(45) Date of Patent: Mar. 23, 2021

(54) DETACHABLE TRANSPORTATION VEHICLE SEAT ASSEMBLY

(71) Applicant: Freedman Seating Company, Chicago, IL (US)

(72) Inventors: William Bellin O'Connor, Chicago, IL (US); Vlad Balef, Northbrook, IL (US); Paul Vidri, Chicago, IL (US)

(73) Assignee: Freedman Seating Company, Chicago, IL (US)

( * ) Notice: Subject to any disclaimer, the term of this patent is extended or adjusted under 35 U.S.C. 154(b) by 93 days.

(21) Appl. No.: 16/297,239

(22) Filed: Mar. 8, 2019

(65) Prior Publication Data

US 2019/0275913 A1    Sep. 12, 2019

Related U.S. Application Data

(60) Provisional application No. 62/641,016, filed on Mar. 9, 2018.

(51) Int. Cl.
*B60N 2/01* (2006.01)
*B60N 2/68* (2006.01)
*B60N 2/24* (2006.01)

(52) U.S. Cl.
CPC .............. *B60N 2/012* (2013.01); *B60N 2/242* (2013.01); *B60N 2/686* (2013.01)

(58) Field of Classification Search
None
See application file for complete search history.

(56) References Cited

U.S. PATENT DOCUMENTS

| | | | | |
|---|---|---|---|---|
| 3,912,033 A | * | 10/1975 | Ancel | B62D 61/08 180/307 |
| 4,361,338 A | * | 11/1982 | Kuchenbecker | B62K 5/02 280/828 |
| 8,403,410 B1 | * | 3/2013 | Pinger | B60N 2/2222 297/188.05 |
| 2013/0001394 A1 | * | 1/2013 | Calvert | B60N 2/36 248/429 |
| 2013/0020847 A1 | * | 1/2013 | Smith | B60N 2/688 297/228.13 |
| 2016/0229322 A1 | * | 8/2016 | Line | B60N 2/682 |
| 2018/0251050 A1 | * | 9/2018 | Damerow | B60N 2/2222 |
| 2019/0143852 A1 | * | 5/2019 | Ewel | B60N 2/2236 297/354.12 |

FOREIGN PATENT DOCUMENTS

| | | | | |
|---|---|---|---|---|
| EP | 1302360 A1 | * | 4/2003 | B60N 2/012 |
| WO | WO-2011127289 A1 | * | 10/2011 | B60N 2/682 |

* cited by examiner

*Primary Examiner* — Lori L Lyjak
(74) *Attorney, Agent, or Firm* — Greenberg Traurig, LLP (57) ABSTRACT

A detachable transportation seat assembly for facilitated and secure attachment to the rear row of a mass transportation vehicle, which is releasable and replaceable as desired to enable access to vehicle componentry under the rear seat, or behind the rear wall. A pivot bar on the front of a single or a collection of rear row vehicle seats projects to cooperate with a pivot hook retention bracket, to facilitate removal of the seat or seats, or, alternatively, to facilitate the restoration of the seats for use by passengers.

16 Claims, 8 Drawing Sheets

DETACHABLE TRANSPORTATION VEHICLE SEAT ASSEMBLY

FIELD OF THE DISCLOSURE

The present disclosure relates to the releasable attachment of a seat in a vehicle and more particularly to a seat intended for installation in the rear row of mass transportation vehicles such as those used for public transit buses and private carriage buses or coaches, where the removal of the seat is required to gain access to the engine compartment or other under seat areas of the vehicle from inside the vehicle. Principles of the present invention may further be adapted for other environments beyond the rear row of buses and beyond mass transit vehicles.

BACKGROUND OF THE INVENTION

Historically, seats in the back row of transit buses and motor coaches were not required to include safety belts. If the rear row of seats did utilize safety belts, they were typically lap restraint belts that extended across the passenger's lap, which belt assemblies were connected directly to the vehicle's adjacent seat environment on either side of the seat, with or without components capable of restraining the passenger's upper body for shoulder restraint, in the event of a crash.

More recently, government regulations have gone into effect that now require each seating position, including seats along the rear row of certain coaches or transit buses—to not only include lap-type seat belts, but also to include three-point (3PT) safety belts capable of restraining the shoulder or torso of a passenger. A 3PT safety belt is one where the safety belt, when fully deployed, is capable of restraining a passenger at three separate axis points, one on either side of a passenger's lap and one over the passenger's left or right shoulder. These types of 3PT safety belts are known in the automotive industry and are now common to passenger vehicles. In addition to requiring installation of 3PT safety belts, the regulations also require that the 3PT safety belt to meet certain testing guidelines—as to how much load force or "pull" the safety belts must endure without breaking or detaching.

While the 3PT safety belts may typically be mounted to the bus directly, such as by attachment to the vehicle's sheet metal surfaces, partitions, wheel wells or vehicle side walls adjacent a seat, those safety belts securement locations typically require re-testing every time a seat securement location is altered or moved. To minimize the need for such repetitive, costly safety belt testing, in view of the many types of vehicles and seat configurations for those vehicles, all aspects of the 3PT safety belt may advantageously be attached directly to the seat. This configuration is referred to as an "all belts to seat" configuration or an ABTS-type seat. Under current guidelines, employing an ABTS configuration does not require re-testing of the safety belts when a fully integrated seat, belts and all, is merely moved and replaced. This minimization of retesting is significant especially as it relates to seats that may be covering hatches, panels or other openings in the vehicle that may permit access to mechanical portions of the bus, such as the engine, battery, or radiator compartment, from inside the bus. It is not unusual for an access panel to be positioned under or behind the back row of seats in a bus or coach for that purpose of such access to address repair, removal, testing or inspection of a vehicle's mechanical drive system.

SUMMARY OF THE INVENTION

It is an object of the present disclosure to provide a seating apparatus for the facilitated release and removal of the seating apparatus from a restrainably installed position within a vehicle—as well as for the expedited reinstallation or re-attachment of the seat, or a plurality of similarly constructed adjacent, integrated seats, back into its (their) restrained position after its (their) removal. The seating apparatus comprises an integrated seat, of a unitary body construction, with a seat portion and a seat back. The integrated seat is positioned on top of a seat frame which includes a pivot bar proximate to the front of the seat portion. A seat back support bracket is positioned proximate to the top of the seat back. The seat back support bracket contains at least one hole for receipt of a corresponding locking bolt. A corresponding vehicle support bracket, which also contains a hole through which the same locking bolt may be inserted, is attached to the vehicle and extends towards the seat back support bracket. The seat back support bracket and vehicle support bracket overlap and interface such that the respective holes align for receipt of the locking bolt to restrain the seat back to the vehicle.

A pivot hook retention bracket may be mounted to the surface of the vehicle, proximate to the front of the seat portion when the integrated seat is installed in the vehicle. The pivot hook retention bracket includes an indent or hook area for receipt of, and cooperation with, the pivot bar so that the integrated seat may be rotated about an axis formed by the pivot bar when the locking bolt is removed and the seat is no longer restrained at the seat back.

DETAILED DESCRIPTION OF THE EMBODIMENTS

The following description of an exemplary apparatus embodiment is not intended to limit the scope of the description to the precise form detailed herein. Instead the following description is intended to be illustrative so that others may follow its teachings.

Figure 1:
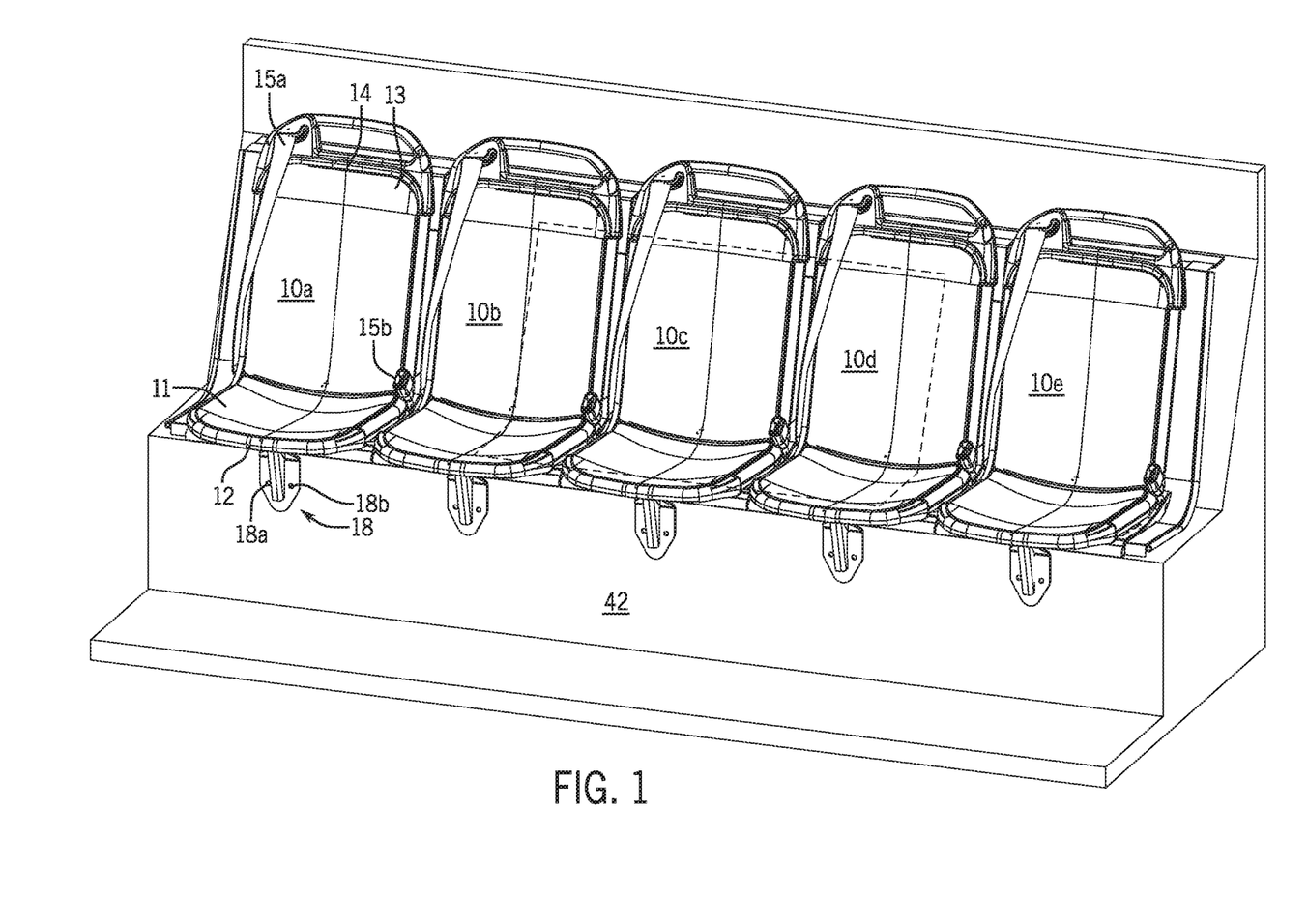
FIG. 1 is a front perspective view of a row of five seats as they would be installed in the rear row of a transit bus or coach, according to one embodiment of the present invention.
Figure 6:
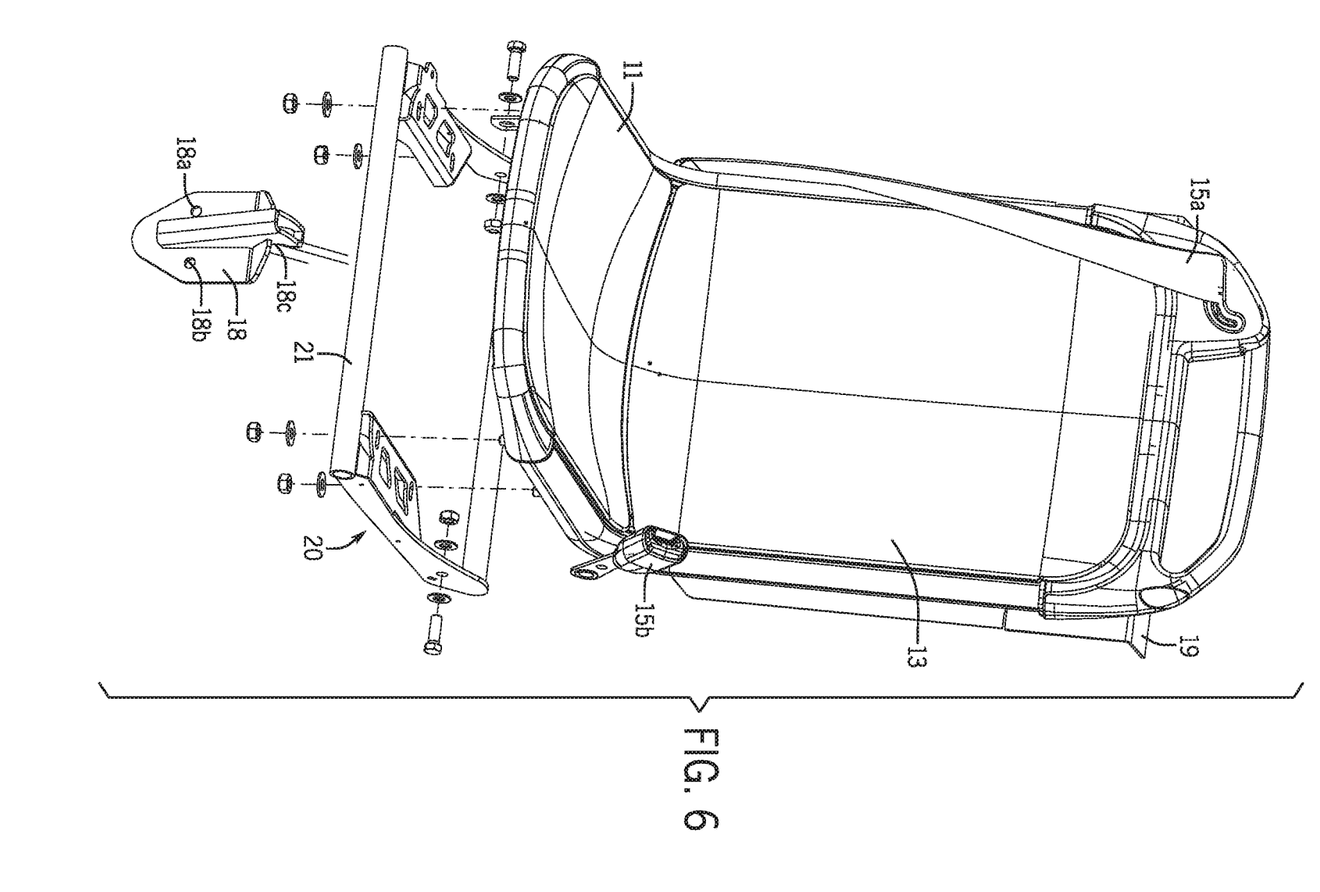
FIG. 6 is a substantially exploded perspective view of the single seat of FIG. 5 showing the pivot hook retention bracket positioned in front of the seat, for cooperation therewith.

FIG. 1 is a front perspective view of a row of five restrainably attached seats 10a through 10e in a transit vehicle's rear row, as installed in a transit bus or coach according to one embodiment of the present invention. Although not required for purposes of the invention, the seats 10a through 10e are preferably made of a unitary hard-shell construction. In other embodiments, the seats may be fully or partially upholstered or have upholstered inserts. In either case, the seat, such as seat 10d, typically includes a seat portion 11, a seat back 13 rigidly affixed thereto, and a seat frame 20 restrainably attached to, and under, at least seat portion 11, as shown in at least FIGS. 6 and 7. The hard-shell seat construction of seat 10d may be comprised of an aluminum skeleton which can be reinforced by steel positioned underneath plastic, as is already well known in the art.

Figure 2:
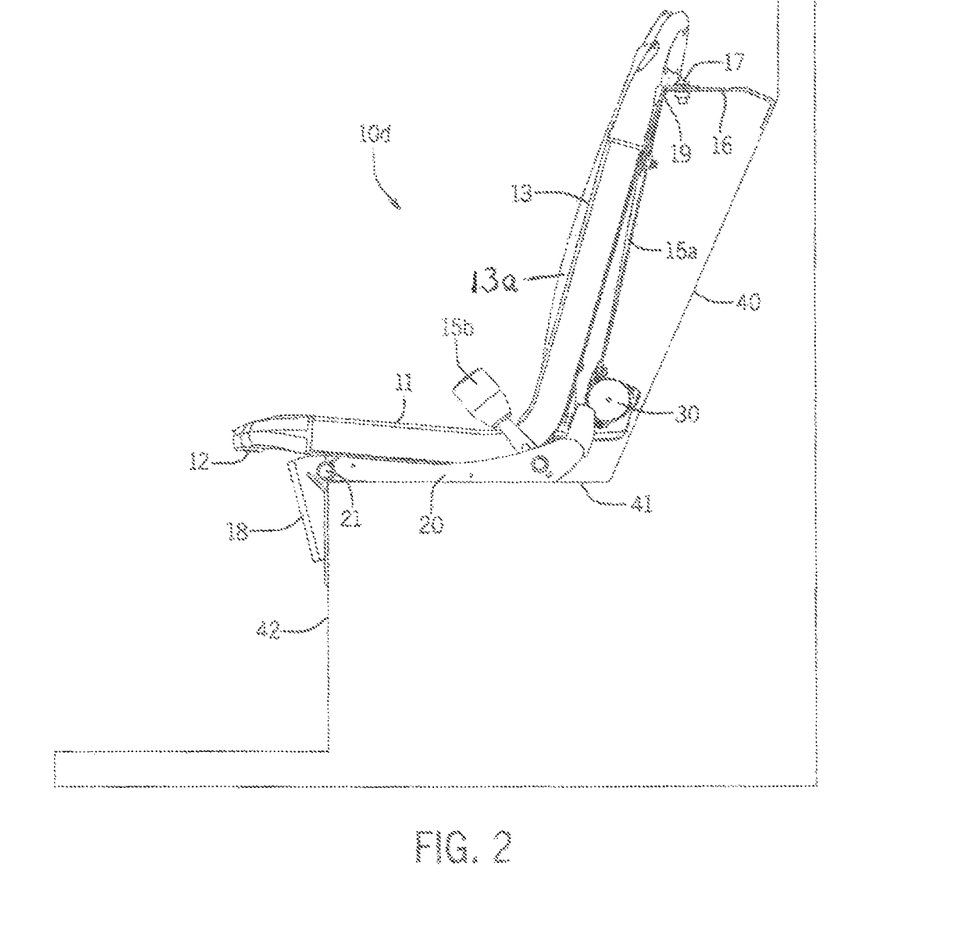
FIG. 2 is an elevated side view of a single seat, integrated seat 10d (the second from the right-most seat of FIG. 1) as it would be restrainably installed in a rear row.
Figure 3:
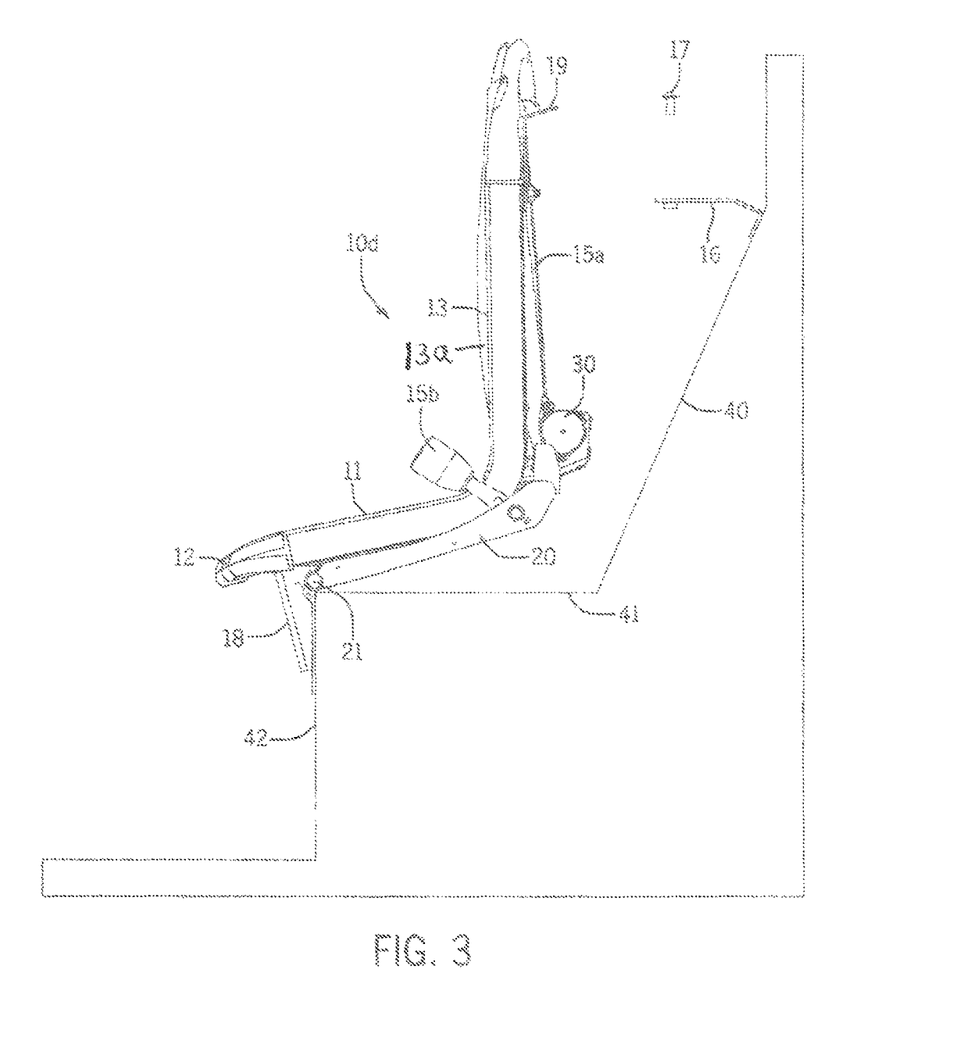
FIG. 3 is an elevated side view of single seat 10d of FIG. 2 as it is being uninstalled and initially removed from its restrained position in the rear row.
Figure 4:
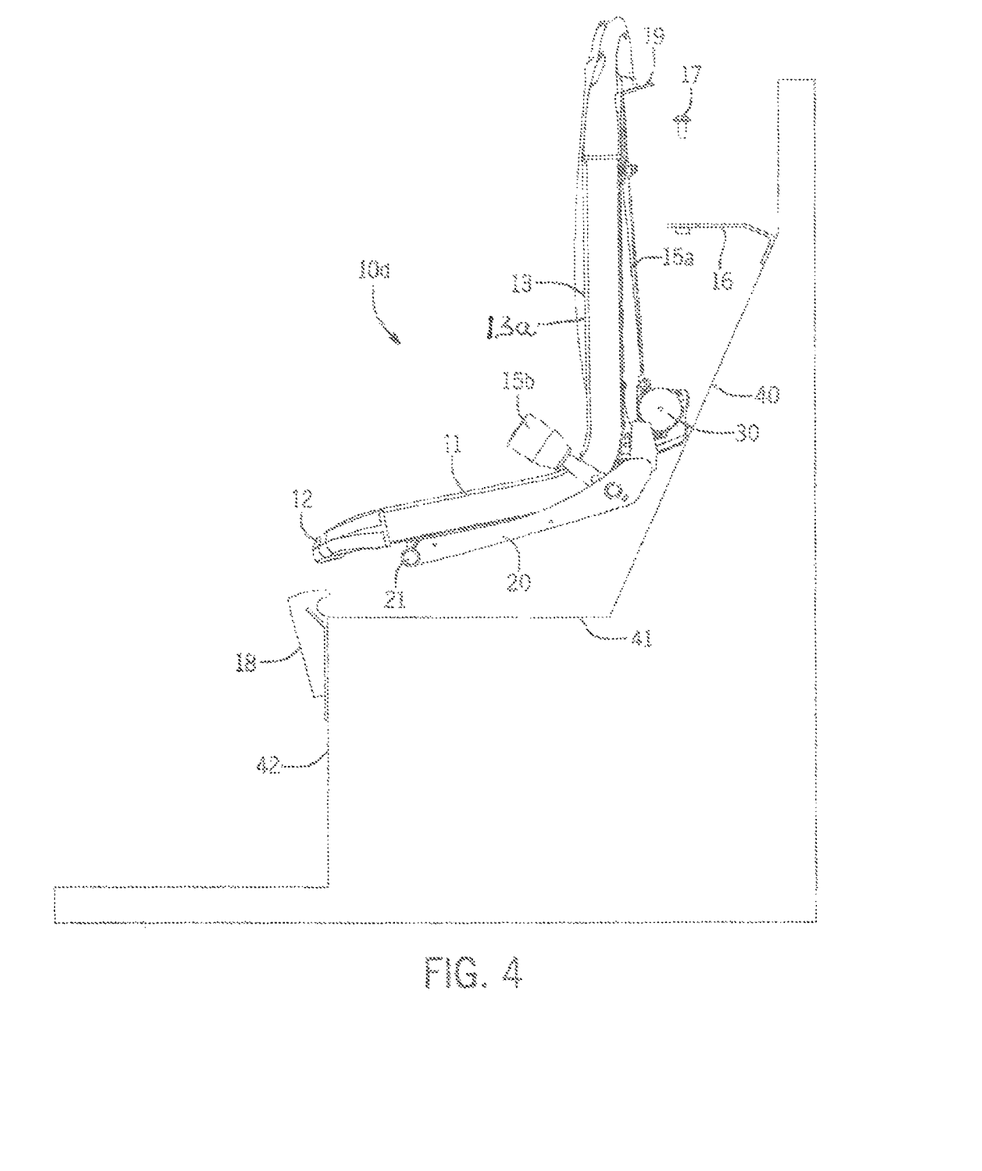
FIG. 4 is a further side view of the single seat of FIG. 2 where the seat has been pivoted and then retracted from its restrained position in retention bracket 18 to enable complete removal from the rear row.

Alternatively, seat 10 may be constructed so that seat portion 11 and seat back 13 comprise separate, individual components. Where seat 10 is comprised of separate components, those components may be of different materials and construction. For example, seat portion 11 may include a removable upholstered cushion, such as removable upholstered insert 13a, as shown in FIGS. 2 through 4, while seat back 13 may remain a hard-shell construction or itself be upholstered. Nonetheless, in the unitary construction embodiment, seat 10 includes seat portion 11, with front edge 12 and seat back 13, with top edge 14. Seat portion 11 is often integrated with, and substantially perpendicular, or transverse to seat back 13 at a particular, desired rake angle. To facilitate removal of the detachable seats, the additional upholstered components, for example, can be removed to reduce the weight of the seat or integrated seats.

In the embodiment configuration of FIG. 1, the back row far left seat 10a and far right seat 10e are often individual seats, while the remaining three middle seats 10b-d may be joined together along their respective frames or side edges, so as to be installed or removed as a single, integrated three seat unit. As should be appreciated, any combination of individual or multiple joined seats may be utilized and would fall within the teachings of the invention.

Behind and covered by the row of seats 10 (as shown in dashed lines) is often a hatch, door or panel that provides access to the engine or other compartment of the transit bus or coach from inside the vehicle. To obtain access to the hatch or panel, one or more of seats 10 may need to be uninstalled and removed in an articulated manner—to be re-installed back into their original positions after such access. The hatch or panel may be under only one seat or under multiple seats. In FIG. 1, the hatch or panel extends from behind and underneath a portion of seat 10b to behind and underneath a portion of 10d, requiring seats 10b through 10d to be removed, for access to the engine or other compartment from inside the bus or coach.

As shown in FIG. 2, integrated into seat 10d is 3PT safety belt apparatus 15 which is comprised of belt 15a, belt buckle 15b and belt retractor 15c—in the environment of an ABTS-type seat construction. In operation, when a passenger is seated, they would pull belt 15a from behind the passenger's right shoulder, proximate top edge 14 of seat back 13, downwardly towards belt buckle 15b adjacent to the passenger's left hip, to lock the belt into place. Belt 15a also could extend from spring biased retractor 30 in which belt 15a retracts upon release. Upon release of belt 15a from buckle 15b, belt 15a would return to its position over the passenger's right shoulder. While the drawings demonstrate belt 15a emanating from over the right shoulder of a passenger, it should be appreciated that it could just as equally emanate from over a passenger's left shoulder, with the associated buckle being located proximate the passenger's right hip. Also shown in FIG. 2 is optional upholstered insert 13a emanating from seat back 13.

Mounted to a wall of the vehicle, at positions underneath the respective front edges 12 of seats 10a through 10e, are pivot hook retention brackets 18. In the embodiment depicted in the drawings, there is one pivot hook retention bracket 18 associated with each seat 10. It is possible, however, to use more than one pivot hook retention bracket in association with one seat. Likewise, in the embodiment in which seats 10b through 10d are attached to one another to form a unitary component for simultaneous detachment as an integrated unit, one, two or three pivot hook retention brackets can be utilized to collectively restrain that integrated unit of three seats, as required. Where one such pivot hook retention bracket is utilized it may be aligned with seat 10c. Where two such pivot hook retention brackets are utilized, they may be each aligned with seats 10b and 10d, respectively. As will be described in more detail below, pivot hook retention bracket 18 aligns and cooperates with pivot bar 21 of seat frame 20 to maintain seat 10d in position once restrainably installed.

Shown in FIG. 2 are seat support bracket 19, vehicle support bracket 16 and locking bolt(s) 17 that attach the seat backs of seats 10a through 10e to slanted or upright support wall 40 of the bus or coach, positioned behind seats 10. Also shown in FIG. 2 is seat frame 20 which is operably positioned between seat portion 11 and horizontal support surface 41 of the bus or coach on which seat frame 20 rests.

FIGS. 2 through 4 show elevated side views of seat 10d transitioning from being fully, restrainably installed in FIG. 2, to being removed in FIG. 4. As shown in FIGS. 2-4, seat frame 20 is positioned beneath seat portion 11 of seat assembly 10d so that pivot bar 21 of seat frame 20 may pivotably engage the pivot hook 18c of retention bracket 18, upon restrained installation. Seat frame 20 specifically engages pivot hook retention bracket 18 through the positioning of pivot bar 21 within indent area 18c shown in FIGS. 4, 9 and 10. Preferably pivot bar 21 is a substantially cylindrical bar or tube that extends substantially across the width of seat 10 proximate to front edge 12 of seat portion 11. Pivot bar 21 may be of a solid or hollow construction and may be manufactured of any suitable material, such as rigid aluminum or steel, capable of fulfilling the intended purpose of restrainably, and pivotably working in concert with pivot hook retention bracket 18, to maintain seat 10d in place.

Vehicle support bracket 16 emanates outwardly from upright or slanted support wall 40 of the bus or coach, towards seat back 13 of seat 10d. As shown in FIGS. 2-4, vehicle support bracket 16 contains at least one hole through which locking bolt 17 may be inserted. Similarly, emanating outwardly from seat back 13 towards support wall 40 is seat back support bracket 19. Seat back support bracket 19 also contains at least one hole, for alignment with and releasable receipt of locking bolt 17. As shown in FIG. 2, when installed, vehicle support bracket 16 and seat back support bracket 19 at least partially overlap to enable the respective holes in each bracket to align, and to permit locking bolt 17 to traverse through each respective hole, thereby restricting the movement of seat back 13 of seat 10 relative to the vehicle.

Figure 7:
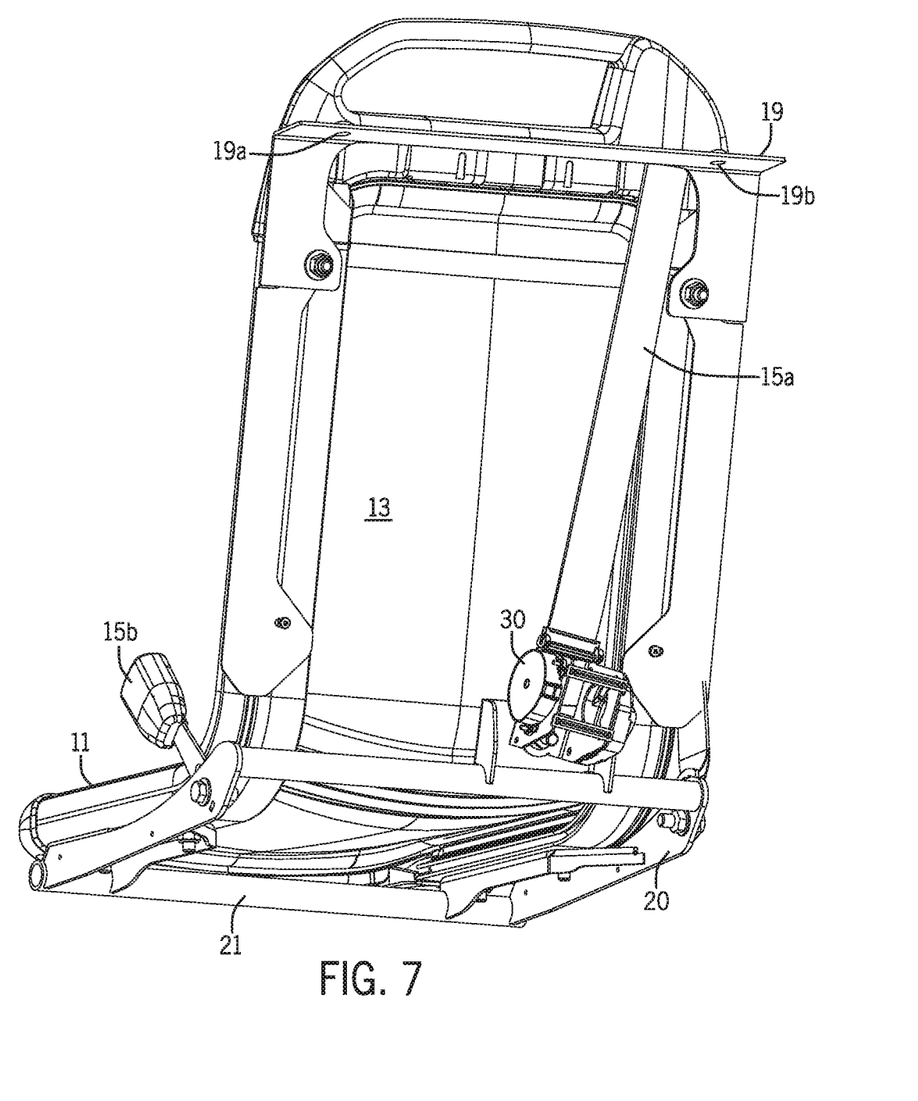
FIG. 7 is a rear perspective view of the single seat depicted in FIG. 5.

Also shown in FIGS. 2 through 4 is safety belt retractor 30, which is of a type known in the art. In one embodiment of the invention, belt retractor 30 is positioned behind seat 10d and is attached to seat back 13, towards its bottom rear; and is positioned to be proximate to where seat portion 11 is integrated into the seat back 13. In another embodiment, belt retractor 30 is positioned behind seat 10, and is attached to a portion of seat frame 20, as shown in FIG. 7. It will be appreciated that belt retractor 30 need not be positioned as shown in the figures, but may be positioned anywhere known in the industry so long as belt retractor 30 is attached to a portion of seat 10d and not a portion of the vehicle, to enable it to perform its intended function and still qualify as an ABTS-type seat assembly. Also shown in FIGS. 2 through 4 is optional upholstered insert 13a emanating from seat back 13.

Figure 5:
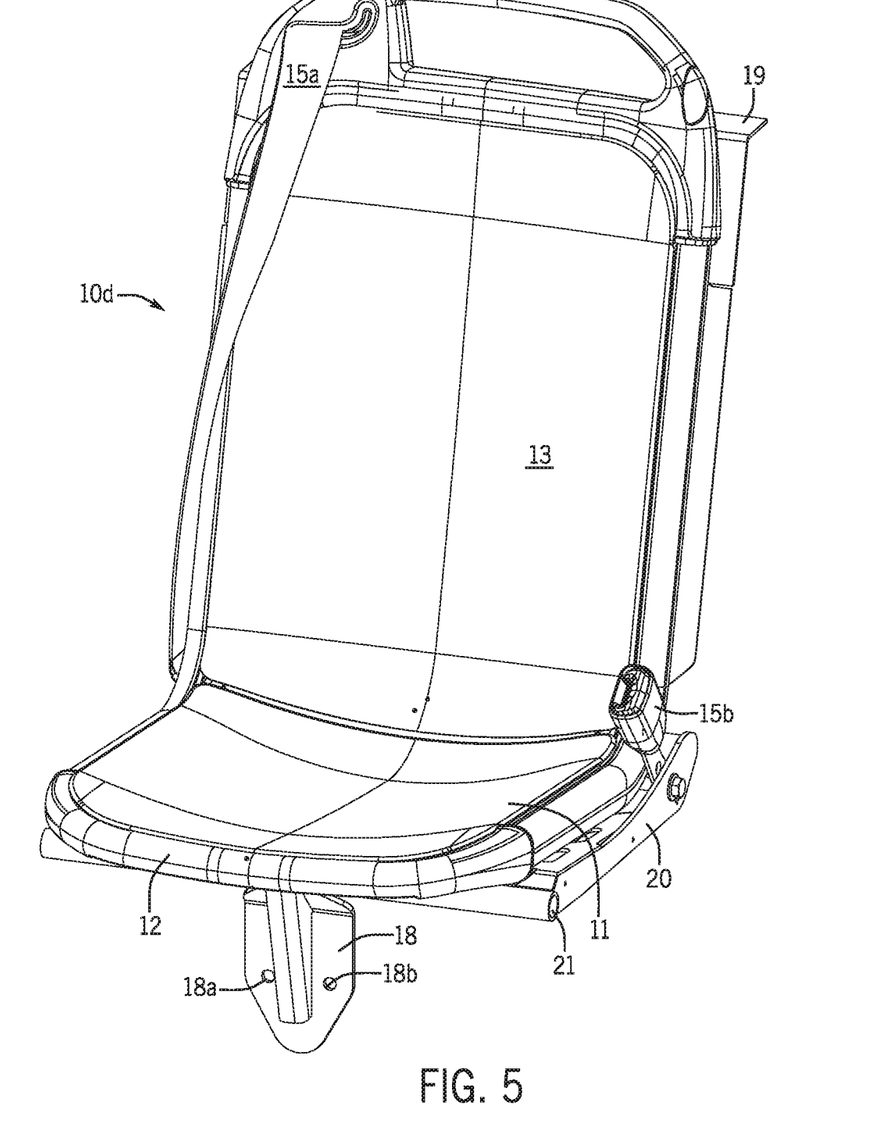
FIG. 5 is a front perspective view of the single seat of FIG. 2, showing the pivot hook retention bracket engaging the seat frame at the pivot bar and without reference to its further restrained environment.

In FIG. 3, locking bolt 17 has been removed from its locking position and seat 10d has been released from its restrained, installed position and has been pivoted away from vertical support structure 40 of the bus or coach, so that vehicle support bracket 16 and seat back support bracket 19 are no longer overlapping one another in an aligned fashion. When detaching seat 10d, it may be pivoted about the axis running along the length of pivot bar 21 when pivot bar 21 is rotated pivoted within indent area 18c of pivot hook retention bracket 18. Seat 10d may be completely uninstalled from its restrained position as seen in FIG. 4 whereby pivot bar 21 no longer engages pivot hook retention bracket 18. Seat 10d is thereby uninstalled and removed thereby permitting access to behind the seat to be obtained. The process may be completely reversed to reinstall or re-attach seat 10d back into its restrained position within the last row of the vehicle. Single last row seat 10d is configured to cooperate with associated pivot hook retention bracket 18, seat back support bracket 19 and seat frame 20, as shown in isolation in FIG. 5, and in the isolated exploded view of FIG. 6.

Seat back support bracket 19 may be positioned proximate to top edge 14 of seat back 15, as shown in FIG. 7. In one embodiment, seat back support bracket 19 has two holes or apertures 19a and 19b that are preferably proximate the left and right sides of seat 10. When seat 10d is restrainably installed within the bus or coach, holes 19a and 19b overlap and align with corresponding holes in vehicle support bracket 16 for receipt of locking bolt(s) 17. While two holes 19a and 19b are shown in the figures, it will be appreciated that any number of holes may be utilized and be positioned within seat back support bracket 19—so long as seat 10d may be restrainably installed by overlapping vehicle support bracket 16 and seat back support bracket 19, so that their respective fastener apertures align for receipt of a corresponding number of locking bolts 17. It will also be appreciated that locking bolt(s) 17 may comprise other fastener mechanisms that are suitable for the purposes of releasably restraining vehicle support bracket 16 to seat back support bracket 19, such as clips, locking pins or a number of other fastener types.

In an alternative embodiment, the relative positions of seat back support bracket 19 and pivot hook retention bracket 18 may be interchanged. In such an embodiment, pivot hook retention bracket would be positioned on vertical support wall 40 with indent area 18c emanating to restrain and co-operate with back support 13. Back support bracket 19 would be positioned on seat portion 11 to be restrained and bolted to support wall 42 either directly or through use of a support bracket that is positioned below or near the front of a seat.

Figure 8:
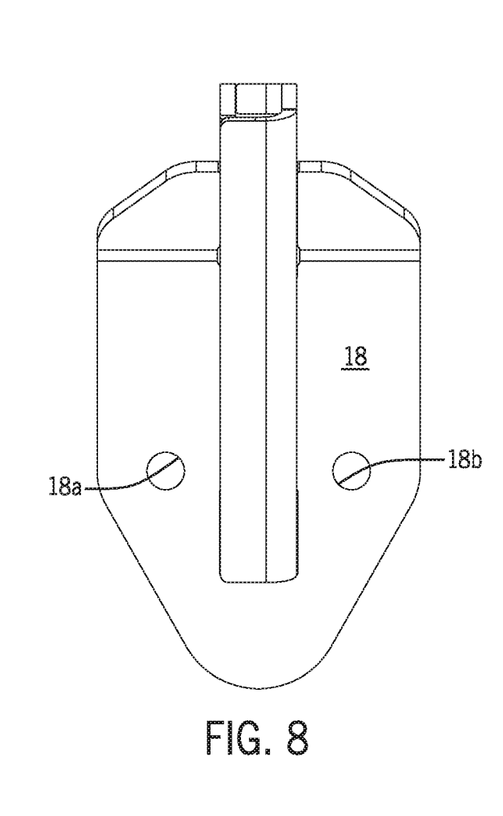
FIG. 8 is an elevated front view of the pivot hook retention bracket according to the present invention.
Figure 9:
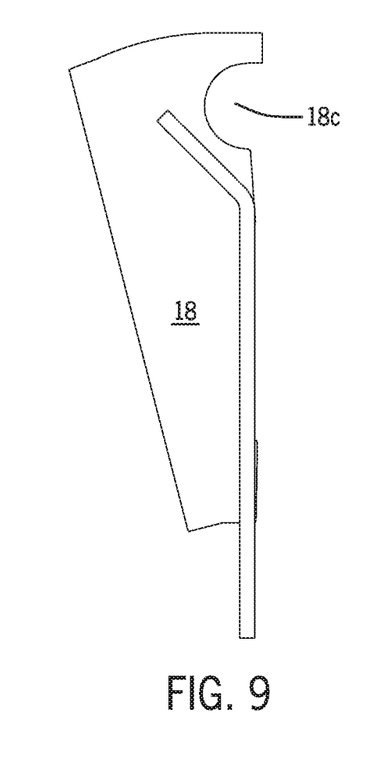
FIG. 9 is an elevated side view of the pivot hook retention bracket according to the present invention.
Figure 10:
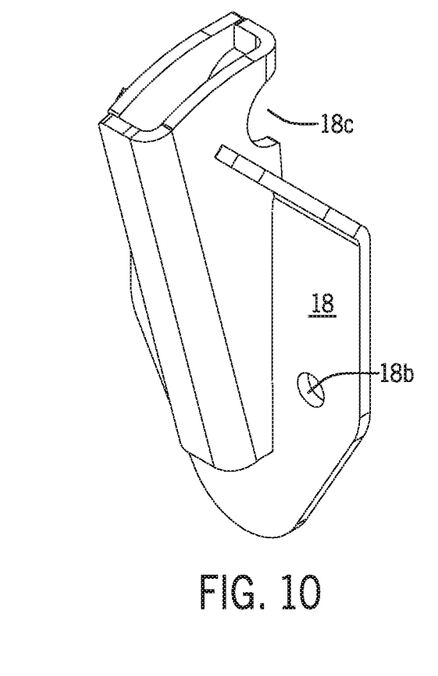
FIG. 10 is a front perspective view of the pivot hook retention bracket according to the present invention.

FIGS. 8, 9 and 10 show an elevated front view, an elevated side view and a front perspective view, respectively, of pivot hook retention bracket 18 in isolation. Holes 18a and 18b receive bolts or screws (not shown) for mounting or attaching pivot hook retention bracket 18 to the vehicle's support wall 42. In addition to bolts or screws, pivot hook retention bracket 18 may be attached by welding, adhesive and other suitable mechanisms or processes, either singly or in combination, known in the industry for such purposes.

Indent area 18c is operatively positioned for receipt and engagement of pivot bar 21 of seat frame 20. As shown in the drawings, indent area 18c is sized and shaped in a generally c-shaped configuration to accommodate the rotation or pivoting of pivot bar 21 within indent area 18c while seat 10d is translating from a restrained, installed position to an uninstalled position—and back to its installed, restrained position. However, it will be appreciated that indent area 18c is not limited to any particular size and shape, but may be of any size or shape suitable to permit the retention of seat 10 when installed and the rotation of seat 10 about pivot bar 21 of seat frame 20 when seat 10 moves from a restrained, installed position to its uninstalled position and vice-versa.

Although certain example embodiments have been described herein, the scope of coverage of this disclosure is not limited thereto. To the contrary, this disclosure covers all methods, apparatuses, and articles of manufacture fairly falling within the scope of the disclosure, either literally or under the doctrine of equivalents, as are presented in any non-provisional patent application filed hereon.

What is claimed is:

1. A seating apparatus assembly for the facilitated release and removal from a restrainably installed position within a vehicle, said seating apparatus comprising:

an integrated seat, including a seat portion having a front edge and a seat back having a top edge such that said integrated seat is a unitary body extending from said front edge of said seat portion to said top edge of said seat back and where said seat portion and said seat back are substantially angled relative to each other;

a seat frame, at least a portion of which seat frame is positioned underneath said seat portion, said seat frame including a pivot bar which is substantially proximate to said front edge of said seat portion, where said pivot bar extends across at least a portion of the width of said seat portion;

at least one seat back support bracket positioned substantially proximate to the top edge of said seat back, said at least one seat back support bracket containing at least one aperture for receipt of a corresponding locking bolt;

at least one vehicle support bracket configured to be attached to said vehicle and emanating towards said at least one seat back support bracket for attachment to said at least one seat back support bracket; and at least one pivot hook retention bracket configured to be mounted to said vehicle proximate to said front edge of said seat portion when said seat is restrainably installed in said vehicle, for releasably receiving and affixing said pivot bar, whereby said integrated seat is releasably secured at both said pivot hook and said vehicle support bracket.

2. The seating apparatus assembly of claim 1, in which said at least one vehicle support bracket contains at least one aperture for alignment and overlapping cooperation with said respective corresponding aperture of said at least one seat back support bracket, whereby said locking bolt may be inserted into and through both said aperture in said seat back support bracket and the corresponding aperture in said vehicle support bracket when said seat is restrainably installed in said vehicle.

3. The seating apparatus assembly of claim 1, in which said pivot hook retention bracket is configured to align with the pivot bar of said seat frame, and said pivot hook retention bracket includes an indent area for receipt of and releasable cooperation with said pivot bar of said seat frame, when said seat is in said restrainably installed position.

4. The seating apparatus assembly of claim 3, in which said integrated seat is capable of being rotated about a longitudinal axis formed by said pivot bar upon being positioned in said indent area, when said locking bolt is removed from said respective apertures in said vehicle support bracket and said seat back support bracket, to, in turn, enable the pivoting of said seat within said indent area, the retraction of said pivot bar from the retention bracket and the removal of said seat from said restrainably installed position, once said seat back support bracket is removed from said vehicle support bracket.

5. The seating apparatus assembly of claim 1 wherein said unitary body is a hard-shell plastic body.

6. The seating apparatus assembly of claim 5 where said hard-shell plastic body includes an aluminum skeleton.

7. The seating apparatus assembly of claim 1 wherein at least one of said seat portion and said seat back is upholstered.

8. The seating apparatus assembly of claim 7 wherein said upholstery is removable from said at least one of said seat portion and said seat back.

9. The seating apparatus assembly of claim 1 where in at least one of said seat portion and seat back contains an upholstery insert.

10. A seating apparatus assembly for the facilitated release and removal from a restrainably installed position within a vehicle, said seating apparatus comprising:
an integrated seat formed of a multi-piece body including at least a seat portion having a front and back edge and a seat back having a bottom and top edge such that said back edge of said seat portion is positioned underneath the bottom edge of said seat back so that said seat portion and said seat back are substantially angled relative to each other;
a seat frame, at least a portion of which seat frame is positioned underneath said seat portion, said seat frame including a pivot bar which is substantially proximate to said front edge of said seat portion, where said pivot bar extends across at least a portion of the width of said seat portion;
at least one seat back support bracket positioned substantially proximate to the top edge of said seat back, said at least one seat back support bracket containing at least one aperture for receipt of a corresponding locking bolt;
at least one vehicle support bracket configured to be attached to said vehicle and emanating towards said at least one seat back support bracket, said at least one vehicle support bracket containing at least one aperture for alignment and overlapping interface with said respective corresponding aperture of said at least one seat back support bracket whereby said locking bolt may be inserted into and through both said aperture in said seat back support bracket and the corresponding aperture in said vehicle support bracket when said seat is restrainably installed in said vehicle; and
at least one pivot hook retention bracket configured to be mounted to said vehicle proximate to said front edge of said seat portion when said seat is restrainably installed in said vehicle, said pivot hook retention bracket configured to align with the pivot bar of said seat frame, said pivot hook retention bracket including an indent area for the releasable receipt of, and cooperation with, said pivot bar of said seat frame, when said seat is in said restrainably installed position,
whereby said integrated seat is orientated for rotation about an axis formed by said pivot bar upon being positioned in said indent area when said locking bolt is removed from said respective apertures in said vehicle support bracket and said seat back support bracket, to in turn enable the pivoting of said seat within said indent area, the retraction of said seat from the retention bracket and the removal of said seat from said restrainably installed position, once said seat back support bracket is removed from the vehicle support bracket.

11. The seating apparatus assembly of claim 10 wherein said seat portion and seat back are a hard-shell plastic body.

12. The seating apparatus assembly of claim 10 wherein at least one of said seat portion and said seat back is upholstered.

13. The seating apparatus assembly of claim 12 wherein said upholstery is removable from said at least one of said seat portion and said seat back.

14. The seating apparatus assembly of claim 10 where in at least one of said seat portion and seat back contains an upholstery insert.

15. The seating apparatus assembly of claim 10 wherein said seat portion and seat back are of different materials.

16. A seating apparatus assembly for the facilitated release and removal from a restrainably installed position within a vehicle, said seating apparatus comprising:
an integrated seat, including a seat portion having a front edge and a seat back having a top edge such that said integrated seat is a unitary body extending from said front edge of said seat portion to said top edge of said seat back and where said seat portion and said seat back are substantially angled relative to each other;
a seat frame, at least a portion of which seat frame is positioned underneath said seat portion, said seat frame including a seat support bracket which is substantially proximate to said front edge of said seat portion, said seat support bracket containing at least one aperture for receipt of a corresponding locking bolt;
at least one pivot bar positioned substantially proximate to the top edge of said seat back, where said pivot bar extends across at least a portion of the width of said seat back;
at least one vehicle support bracket configured to be attached to said vehicle and emanating towards said at least one seat support bracket, said at least one vehicle support bracket containing at least one aperture for alignment and overlapping interface with said respective corresponding aperture of said at least one seat support bracket whereby said locking bolt may be inserted into and through both said aperture in said seat support bracket and said corresponding aperture in said vehicle support bracket when said seat is restrainably installed in said vehicle; and at least one pivot hook retention bracket configured to be mounted to said vehicle proximate to said top edge of said seat back portion when said seat is restrainably and removably installed in said vehicle, said pivot hook retention bracket configured to align with the pivot bar of said seat back, said pivot hook retention bracket including an indent area for receipt of and cooperation with said pivot bar of said seat back, when said seat is in said restrainably installed position, whereby said integrated seat is enabled to be rotated about an axis formed by said pivot bar upon being positioned in said indent area when said locking bolt is removed from said respective apertures in said vehicle support bracket and said seat support bracket, to in turn enable the pivoting of said seat within said indent area, the retraction of said seat from the retention bracket and the removal of said seat from said restrainably installed position, once said seat support bracket is removed from said vehicle support bracket.

* * * * *